Patented July 20, 1948

2,445,356

UNITED STATES PATENT OFFICE 2,445,356

THIOL DERIVATIVES

Morris S. Kharasch, Chicago, Ill., and Sidney Weinhouse, Chester, Pa., assignors to the United States of America as represented by the Secretary of War No Drawing. Application January 17, 1944, Serial No. 518,582

4 Claims. (Cl. 260—534)

This invention relates to water-soluble derivatives of aliphatic thiols and to a process for producing these derivatives.

Aliphatic thiols such as, for example, 2,3-dithioglycerol, 1,3-dithioglycerol and 1,3-dithiolpropane have been employed as pharmaceuticals and as anti-vesicants in the treatment of burns caused by arsenical compounds. These compounds, in general, are oily, water-insoluble liquids and are characterized by their unpleasant odors and toxic action on skin. These characteristics make the use of aliphatic thiols undesirable and furthermore limit their effectiveness in the foregoing and other applications.

This invention has as its object a process for converting water-insoluble, toxic aliphatic thiols to water-soluble, non-toxic derivatives.

Another object is to produce substantially odorless, water-soluble derivatives of aliphatic thiols.

Another object is to produce solid granular, water-soluble derivatives of aliphatic thiols.

Another object is to produce water-soluble, non-toxic derivatives of aliphatic thiols by a simple and economical method.

Other objects will be apparent from the following description of the invention.

These objects are accomplished by the following invention which comprises reacting an aliphatic thiol with primary or secondary amino compounds containing solubilizing groups, e. g. COOH, COONa, SO$_3$H and OH. Amido compounds containing these solubilizing groups and having an N-hydrogen atom may also be used. A water-soluble aliphatic thiol derivative may be prepared by treating an aliphatic thiol with either a methylol derivative of a hydroxylated secondary amine such as diethanolamine or N-methyl glucamine, or a methylol derivative of the sodium salt of an amino acid such as sarcosine, glycine and acetylglycine. These reactions may be formulated by the following equations.

(1) $CH_2O + HNR_1R_2 \longrightarrow HOCH_2NR_1R_2$ (2) $\begin{array}{l}CH_2SH\\|\\CHSH\\|\\CH_2OH\end{array} + HOCH_2NR_1R_2 \longrightarrow \begin{array}{l}CH_2SCH_2NR_1R_2\\|\\CHSH\\|\\CH_2OH\end{array}$ 2, 3-dithioglycerol and (2a) $\begin{array}{l}CH_2SH\\|\\CHSH\\|\\CH_2OH\end{array} + 2HOCH_2NR_1R_2 \longrightarrow \begin{array}{l}CH_2SCH_2NR_1R_2\\|\\CHSCH_2NR_1R_2\\|\\CH_2OH\end{array}$ 2, 3-dithioglycerol wherein R$_1$ is a radical selected from the group comprising hydrogen, alkyl, hydroxyalkyl and acyl, R$_2$ is a radical selected from the group comprising CH$_2$R$_3$, (CH$_2$)$_2$R$_3$, CH$_2$(CHOH)$_4$CH$_2$R$_3$ and C$_6$H$_4$R$_3$, and R$_3$ is a radical selected from the group comprising OH, COOH, COONa and SO$_3$H. Water-soluble, non-toxic derivatives of aliphatic thiols may also be prepared by using an aliphatic thiol as an acid and reacting it with an amine such as diethanolamine and ethylene diamine, to form a water-soluble salt.

In practicing this invention, water-soluble, non-toxic derivatives of aliphatic thiols are simply formed by little more than mixing the reactants. The methylol derivatives are prepared by adding to the amino compound an aqueous 37 per cent solution of formaldehyde. When the formol condensation is complete, one equivalent of the aliphatic thiol is added slowly. The solutions thus formed contain substantially odorless, water-soluble, non-toxic derivatives of the aliphatic thiol.

EXAMPLE I

To diethanolamine (10.4 g.—0.1 mole) cooled in ice, 7.5 cc. of 37 per cent aqueous formaldehyde solution was added in portions. The mixture was cooled and shaken and 2,3-dithioglycerol (12.4 g.—0.1 mole) was added slowly. The resultant clear, odorless, viscous solution had a pH of 8.2. The solution contains approximately 50 per cent by weight of the derivatives of 2,3-dithioglycerol and may be diluted with any volume of water without causing the 2,3-dithioglycerol derivatives to separate.

The toxicities of 2,3-dithioglycerol and the water-soluble reaction production of N-methylol diethanolamine and 2,3-dithioglycerol were determined both by intraperitoneal injection and by skin absorption tests. The toxicities as determined by intraperitoneal injections of equivalent thiol content in mice are given in the following table:

Table I

| Dose, mg/kg. | 2,3-dithioglycerol mortality | Water-soluble 2,3-dithioglycerol derivative mortality |
|---|---|---|
| 25 | 0/8 | |
| 50 | 2/8 | 0/4 |
| 100 | 5/8 | 0/8 |
| 150 | 4/4 | |
| 200 | 4/4 | 0/8 |
| 300 | | 4/12 |
| 400 | | 8/8 |
| 600 | | 4/4 |

The results of the skin absorption tests are as follows. Of four mice swabbed with 1 cc. of 1.6 M 2,3-dithioglycerol in propylene glycol, all died. Of four mice swabbed with 1 cc. of a solution of the N-methylol diethanolamine-2,3-dithioglycerol reaction products having an equivalent thiol content, none died. Two mice were immersed, except for their heads, in 0.8 M aqueous N-methylol diethanolamine derivatives of 2,3-dithioglycerol for 10 minutes and neither of the mice died. The foregoing tests clearly indicate the low toxicity of the water-soluble aliphatic thiol derivatives.

Tests to determine the relative effectiveness of 2,3-dithioglycerol and water-soluble N-methylol diethanolamine derivatives of 2,3-dithioglycerol in the neutralization of burns caused by chlorovinyl dichloroarsine (lewisite) were carried out on groups of men under identical conditions. In conducting the tests small amounts of lewisite were applied by means of standard test rods to both forearms of each man. After a definite interval, one arm was treated with the test agent and the other arm served as a control. Both points of application were observed after 48 hours. The results of the tests indicated that when small or moderate amounts of lewisite were applied to the skin, 5 per cent or 10 per cent solutions of either 2,3-dithioglycerol in propylene glycol or the N-methylol diethanolamine derivatives of 2,3-dithioglycerol in water used within 60 minutes after the application of the lewisite, completely prevented blistering. Under the same conditions, a 2 per cent solution of either compound has only a slight anti-vesicant action, however, the N-methylol diethanolamine derivatives of 2,3-dithioglycerol are somewhat the better of the two. In the case of much larger applications of lewisite, the two compounds were equally effective when used within 5 minutes after the application of the toxic agent.

The process in Example I above was carried out using N-methyl glucamine in place of diethanolamine. The product obtained was a dark red liquid and comprised water-soluble methylol-N-methyl glucamine derivatives of 2,3-dithioglycerol. These derivatives are non-toxic and possess anti-vesicant properties equivalent to those of 2,3-dithioglycerol. The condensation products of aliphatic thiols with the methylol derivatives of amines such as dimethylamine and piperidine, containing no solubilizing groups, are however, water-insoluble.

The water-soluble, non-toxic derivatives of aliphatic thiols obtained from methylol derivatives of sodium salts of amino-acids may be prepared in a manner similar to that described in Example I above.

EXAMPLE II

The sodium salt of sarcosine was prepared by dissolving 0.3 mole sarcosine in 55 cc. of 5.4 N sodium hydroxide. The solution was cooled and agitated, and 24 cc. of 37 per cent aqueous formaldehyde solution was added in portions. The temperature of this solution was kept low and 0.3 mole 2,3-dithioglycerol was added in small portions. A clear, light-yellow, substantially odorless solution was obtained which contained approximately 40 per cent water-soluble, non-toxic derivatives of 2,3-dithioglycerol. The solution could be diluted with any amount of water without causing separation.

The above method was employed to prepare other water-soluble non-toxic derivatives of 2,3-dithioglycerol which are listed in the following table:

Table II

| Sample No. | Amino-Acid | $R_1$ | $R_2$ | Water-Soluble Derivatives |
|---|---|---|---|---|
| 1 | N-methylanthranilic | $-CH_3$ | $-C_6H_4CO_2Na$ | Dark red viscous liquid. |
| 2 | Glycine | $H-$ | $-CH_2COONa$ | Light yellow liquid. |
| 3 | Alpha-pipecolinic | | $-(CH_2)_4CHCO_2Na$ | Yellow liquid. |
| 4 | Beta-hydroxethyl glycine | $-CH_2CH_2OH$ | $-CH_2COONa$ | Do. |
| 5 | Acetylglycine | $-COCH_3$ | $-CH_2COONa$ | Colorless liquid. |
| 6 | Benzoylglycine | $-COC_6H_5$ | $-CH_2COONa$ | Do. |

The derivatives listed in the above table are clear, viscous solutions ranging in pH from 8 to 9. They contain approximately 40 per cent water-soluble derivatives of 2,3-dithioglycerol and can be diluted with water as much as desired without causing separation. Their anti-vesicant characteristics compare favorably with those of 2,3-dithioglycerol.

The water-soluble aliphatic thiol derivatives contemplated by this invention may be converted to solid granular substances which enhances their use as therapeutic agents in some applications. Solid granular forms of the condensation products of 2,3-dithioglycerol and the methylol derivatives of the sodium salts of sarcosine, glycine, acetylglycine and benzoylglycine were prepared by precipitating the water solution in acetone.

EXAMPLE III

An aqueous solution of the condensation product of 2,3-dithioglycerol and the methylol derivative of the sodium salt of sarcosine was poured slowly into cold acetone and vigorously stirred. The product precipitated as a colorless viscous oil which solidified into a granular mass. The solid was collected on a Buchner funnel, thoroughly washed with acetone and dried in a vacuum oven at 40° C. The dried solid was powdered in a mortar and thoroughly dried in a dessicator under a high vacuum. An 87 per cent yield was obtained.

The aqueous solutions and solid forms of the derivatives of aliphatic thiols contemplated by this invention are more stable than the thiols from which they are prepared. When the aqueous solutions of these derivatives are stored at 60° C. for several months a precipitate formed and the odor of the solution changed indicating that decomposition had occurred. Under the same conditions, the solid derivatives change to gummy, semi-liquid masses in a few days. At room temperature, however, both the aqueous solutions and solids remain apparently unchanged for several months. Samples of aqueous solutions of the condensation products of 2,3-dithioglycerol and N-methylol diethanolamine have been stored at room temperature for over two months without loss of their anti-vesicant properties. These derivatives developed heavy precipitates when stored for 2 weeks at 60° C. but were found to be therapeutically as effective as fresh samples. The decomposition of all of the derivatives of this invention is accelerated by oxygen which indicates that cool, dark storage conditions and the use of air-tight containers are advisable.

The aliphatic thiols may be solubilized and detoxified by reacting them with various amines to form salts. Either primary or secondary amines such as diethanolamine and ethylene diamine may be used. In these reactions the mercaptan is used as an acid. These derivatives were prepared by reacting molecular equivalents of either diethalonamine or ethylene diamine and 2,3-dithioglycerol. These reactions produced water-soluble salts, the structure of which has not been definitely established, but it is presumed they are mercaptids. Aqueous solutions of the amino-salts of aliphatic thiols prepared by the above procedure were found to be relatively non-toxic and to have anti-vesicant properties equivalent to those of the thiol derivatives from which they were prepared.

The processes disclosed above for producing water-soluble, non-toxic derivatives will transform 1,3-dithioglycerol and 1,3-dithiolpropane into water-soluble derivatives equivalent to the condensation products of 2,3-dithioglycerol and N-methylol diethanolamine. In reactions to convert 1,3-dithiolpropane to water-soluble derivatives thereof it is necessary to employ a 25 per cent excess of formaldehyde.

This invention constitutes a simple, useful and economical process for converting water-insoluble, toxic aliphatic thiols into water-soluble, non-toxic derivatives, thus affording new compounds for use in concentrated form in aqueous solutions as anti-vesicant agents.

It is apparent that many different embodiments of this invention may be made without departing from the spirit and scope thereof and therefore it is not intended to be limited except as indicated in the appended claims.

Having thus described our invention, what we claim as new and wish to secure by Letters Patent is:

1. A compound selected from the group consisting of 2,3-dithioglycerol, 1,3-dithioglycerol, and 1,3-dithiopropane, in which a mercapto hydrogen atom is replaced by the group

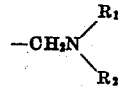

wherein $R_1$ is a radical selected from the group consisting of hydrogen, alkyl, hydroxyalkyl and acyl, $R_2$ is a radical selected from the group consisting of $CH_2R_3$, $(CH_2)_2R_3$, $CH_2(CHOH)_4CH_2R_3$ and $C_6H_4R_3$, and $R_3$ is a radical selected from the group consisting of OH, COOH, and COONa.

2. A diethanolaminomethyl thio ether of 2,3-dithioglycerol.

3. An N-methylglycinomethyl thio ether of 2,3-dithioglycerol.

4. An N-methylglucaminomethyl thio ether of 2,3-dithioglycerol.

MORRIS S. KHARASCH.
SIDNEY WEINHOUSE.

REFERENCES CITED

The following references are of record in the file of this patent:

UNITED STATES PATENTS

| Number | Name | Date |
| --- | --- | --- |
| 2,086,585 | Taub | July 13, 1937 |
| 2,217,846 | Orthner | Oct. 15, 1940 |
| 2,266,747 | Engelmann | Dec. 23, 1941 |

FOREIGN PATENTS

| Number | Country | Date |
| --- | --- | --- |
| 533,219 | Great Britain | Feb. 10, 1941 |

OTHER REFERENCES

Schubert, "Journal of Biol. Chem.," vol. 121, pp. 539–548 (1937).